(12) United States Patent
Xu et al.

(10) Patent No.: US 12,380,403 B2
(45) Date of Patent: Aug. 5, 2025

(54) DETECTION AND REMEDIATION OF IMPROPER VALUE MODIFICATION USING MACHINE LEARNING

(71) Applicant: Maplebear Inc., San Francisco, CA (US)

(72) Inventors: Youdan Xu, Burlingame, CA (US); Aoshi Li, Toronto (CA); Jaclyn Tandler, San Francisco, CA (US); Roman Havran, Toronto (CA); Brendan Evans Ashby, San Francisco, CA (US); Emily Silberstein, San Francisco, CA (US); Ajay Pankaj Sampat, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 257 days.

(21) Appl. No.: 18/204,200

(22) Filed: May 31, 2023

(65) Prior Publication Data
US 2024/0403826 A1 Dec. 5, 2024

(51) Int. Cl.
*G06Q 10/0875* (2023.01)
*G06N 3/084* (2023.01)
*G06Q 20/12* (2012.01)

(52) U.S. Cl.
CPC ......... *G06Q 10/0875* (2013.01); *G06N 3/084* (2013.01); *G06Q 20/12* (2013.01)

(58) Field of Classification Search
CPC .............. G06Q 10/0875; G06Q 20/12; G06Q 20/4016; G06Q 30/06; G06N 3/084
See application file for complete search history.

(56) References Cited

U.S. PATENT DOCUMENTS

| | | | | |
|---|---|---|---|---|
| 11,151,544 B2* | 10/2021 | Grabovski | .......... | G06Q 30/0207 |
| 11,823,102 B2* | 11/2023 | Deng | ............... | G06Q 10/06315 |
| 2004/0034571 A1* | 2/2004 | Wood | ................. | G06Q 30/0601 |
| | | | | 705/26.1 |
| 2012/0254025 A1* | 10/2012 | Prasad | ................... | G06Q 20/12 |
| | | | | 705/40 |
| 2013/0218721 A1* | 8/2013 | Borhan | .................. | G06Q 30/02 |
| | | | | 705/26.41 |
| 2016/0247159 A1* | 8/2016 | Oswald | .................. | G06Q 30/06 |
| 2017/0193584 A1* | 7/2017 | Narasimhan | ....... | G06Q 30/0243 |
| 2019/0304004 A1* | 10/2019 | Schwantes | ......... | G06Q 10/0836 |
| 2023/0245213 A1* | 8/2023 | Faturechi | ........... | G06Q 30/0202 |
| | | | | 705/7.27 |
| 2024/0104493 A1* | 3/2024 | Faturechi | ............. | G06Q 10/087 |

(Continued)

*Primary Examiner* — Michael Jared Walker
(74) *Attorney, Agent, or Firm* — Fenwick & West LLP (57) ABSTRACT

An online concierge system allows customers to place orders to be fulfilled by pickers. An order includes an amount of compensation a customer provides to a picker when the order is fulfilled. A customer may modify the amount of compensation provided to a picker, so some customers may initially specify a large amount of compensation to entice a picker to fulfill an order and then reduce the amount of compensation when the order is fulfilled. To prevent penalizing pickers who fulfilled an order without a problem, the online concierge system trains a model to determine a probability that a reduction in compensation to a picker was unrelated to a problem with order fulfillment. The online concierge system may perform one or more remedial actions for a picker based on the probability determined by the model.

20 Claims, 4 Drawing Sheets

(56) References Cited

U.S. PATENT DOCUMENTS

| | | | |
|---|---|---|---|
| 2024/0193627 A1* | 6/2024 | Sanchez | G06Q 10/083 |
| 2024/0193657 A1* | 6/2024 | Chandrababu | G06Q 30/0617 |
| 2024/0289738 A1* | 8/2024 | Sanchez | G06Q 10/083 |
| 2024/0289739 A1* | 8/2024 | Sanchez | G06Q 10/087 |
| 2024/0289857 A1* | 8/2024 | Maharaj | G06Q 30/0631 |
| 2024/0362580 A1* | 10/2024 | Sanchez | G06Q 10/087 |
| 2024/0386471 A1* | 11/2024 | Vu | G06Q 30/0613 |

* cited by examiner

DETECTION AND REMEDIATION OF IMPROPER VALUE MODIFICATION USING MACHINE LEARNING

BACKGROUND

Online concierge systems receive orders for items from customers and provide them to pickers (or shoppers), who fulfill the orders. To fulfill an order, the online concierge system allocates the order to the picker, who obtains items in an order from a retailer. The picker fulfills the order by delivering the obtained items to a customer.

When placing an order, a customer specifies an amount of compensation the customer provides to a picker fulfilling the order. The online concierge system identifies the amount of compensation provided by the customer when offering an order to pickers, allowing a picker to account for the amount of compensation from the customer when determining whether to select an order for fulfillment. This allows a customer to increase a likelihood of a picker selecting an order for fulfillment by specifying a larger amount of compensation for the picker.

Many online concierge systems allow a customer to modify an amount of compensation provided to a picker when the picker fulfills the order. While a customer may reduce compensation provided to a picker because of problems with order fulfillment by the picker (e.g., selection of low-quality items, late fulfillment of the order), the customer may also reduce the compensation provided to the picker when there are no problems with order fulfillment. This allows a customer to initially specify a large amount of compensation to a picker when placing an order that entices the picker to select the order for fulfillment, then significantly reduce compensation provided to the picker when the order is fulfilled-a phenomenon sometimes referred to as "tip baiting." Such decreases in compensation from customers to a picker after order fulfillment without problems with order fulfillment creates a bad experience for pickers and thus reduces pickers' willingness to work, thereby reducing order fulfillment capability by the online concierge system.

Accordingly, it would be useful to detect tip baiting by an online concierge system so that the system can take remedial actions to reduce the harm that it causes. It may be difficult, however, to determine whether a user reduced a tip for a picker for legitimate reasons or as part of a tip baiting motivation at the kind of scale needed for online concierge systems, as human review is not feasible.

SUMMARY

In accordance with one or more aspects of the disclosure, an online concierge system receives an order for fulfillment from a customer. The order includes items and identifies a retailer from which the items are to be obtained. Additionally, the order includes an amount of compensation the customer provides to a picker who fulfills the order when the picker fulfills the order by delivering the items included in the order to the customer. In various embodiments, the order also specifies a time interval during which the customer requests fulfillment of the order.

After receiving the order, the online concierge system identifies the order to one or more pickers, and a picker selects the order for fulfillment. For example, the online concierge system displays an interface to the picker identifying one or more orders and information describing each order. In various embodiments, the interface displays a number of items included in an order, a retailer from which items in an order are to be obtained, and an amount of compensation provided by a customer to the picker for fulfilling the order. The interface may display other information describing an order in various embodiments. From the interface, the picker selects the order for fulfillment. When selecting an order for fulfillment, the picker may account for the amount of compensation included in different orders, so a customer increases a likelihood of the picker selecting an order for fulfillment by including a large amount of compensation in the order.

In response to selecting the order, the picker obtains the items included in the order. The picker delivers the items included in the order to the customer from whom the order was received. For example, to fulfill the order, the picker delivers the items from the order to a location specified by the order. The online concierge system allows the customer to modify the amount of compensation to the picker for fulfilling the order when the customer receives the order. While this allows the customer to increase the amount of compensation provided to the picker if the customer's satisfaction with fulfillment of the order is high, the customer may also decrease the amount of compensation to the picker if there were problems with order fulfillment. For example, the customer decreases the amount of compensation to the picker in response to the picker fulfilling the order later than a time interval specified by the order or in response to the picker including low quality items in the order.

However, the customer may reduce the amount of compensation to the picker for one or more reasons unrelated to a problem with order fulfillment. For example, the customer may reduce the amount of compensation to the picker to reduce an overall cost of the order to the customer. As the picker accounted for the amount of compensation from the customer when selecting the order for fulfillment, the customer reducing the amount of compensation to the picker for a reason unrelated to a problem with order fulfillment materially changes information on which the picker relied when selecting the order for fulfillment. The customer reducing the amount of compensation provided to the picker after the order was fulfilled for a reason unrelated to order fulfillment decreases a likelihood of the picker continuing to fulfill orders for the online concierge system, reducing order fulfillment capability of the online concierge system.

To protect the picker from a customer reducing the amount of compensation the provided from the customer to the picker for fulfilling the order, in response to receiving a request from the customer to reduce the amount of compensation to the picker, the online concierge system determines an amount by which the customer is reducing the compensation provided to the picker. In various embodiments, the online concierge system determines a monetary amount by which the amount of compensation provided by the customer to the picker is reduced, determines a percentage by which the amount of compensation provided by the customer to the picker is reduced, or determines a monetary amount by which the amount of compensation provided by the customer to the picker is reduced and a percentage by which the amount of compensation provided by the customer to the picker is reduced.

The online concierge system applies a trained compensation reduction model to the amount by which the customer reduced the amount of compensation for the picker, to characteristics of the customer, and to one or more indications of problems with order fulfillment for the order. In various embodiments, characteristics of the customer include a fraud score determined from prior communication with the customer, prior reductions in compensation received from the customer, or other information describing information the online concierge system previously received from the customer. Example indications of problems with fulfillment of the order include a number of replacements for items made by the picker, an indication whether the order was fulfilled in a time interval specified by the order, a rating of the picker, or other information describing fulfillment of the order or prior fulfillment of orders by the picker.

From the amount by which the customer reduced the amount of compensation for the picker, characteristics of the customer, and the one or more indications of problems with order fulfillment for the order, the compensation reduction model determines a probability of the request from the customer to reduce compensation to the picker being unrelated to a problem with order fulfillment by the picker. The online concierge system trains the compensation reduction model based on prior orders fulfilled by pickers and prior reductions in compensation to pickers from customers corresponding to the prior orders. Using prior orders to train the compensation reduction model allows the online concierge system to account for actions by prior customers and pickers when customers previously reduced compensation to pickers.

In various embodiments, the online concierge system compares the determined probability of the request from the customer to reduce compensation to the picker being unrelated to a problem with order fulfillment by the picker to a threshold. In response to the probability of the request from the customer to reduce compensation to the picker being unrelated to a problem with order fulfillment by the picker being less than the threshold, the online concierge system determines the reduction in compensation to the picker was related to a problem with order fulfillment and reduces the amount of compensation to the picker based on the request from the customer. However, in response to the probability of the request from the customer to reduce compensation to the picker exceeding the threshold, the online concierge system determines the reduction in compensation to the picker was unrelated to a problem with order fulfillment by the picker and performs one or more remedial actions to aid the picker.

For a remedial action, in some embodiments the online concierge system provides compensation to the picker in response to the probability of the request from the customer to reduce the amount of compensation the customer provides the picker being unrelated to the problem with order fulfillment exceeding the threshold. The compensation provided by the online concierge system to the picker may be based on the amount of reduction in compensation to the picker by the customer, with larger amounts of reduction corresponding to increased compensation from the online concierge system to the picker. In some embodiments, the amount of compensation from the online concierge system does not exceed a limit maintained by the online concierge system, providing an upper bound on the compensation from the online concierge system to the picker. Alternatively or additionally, the online concierge system transmits a notification to the customer that reduction in compensation to the picker was determined to be unrelated to the problem with order fulfillment, with the notification including a request for the customer to provide one or more reasons for the reduction in compensation from the customer to the picker. Requesting one or more reasons for the reduction in compensation increases an amount of interaction with the online concierge system for the customer to reduce compensation to the picker to discourage the customer from subsequently reducing compensation to a picker for reasons unrelated to order fulfillment. One or more of the remedial actions performed by the online concierge system provide compensation to the picker to offset the reduction in compensation from the customer or increase an amount of interaction from the customer to reduce compensation to the picker for a reason unrelated to order fulfillment, to provide compensation to the picker or to discourage the customer from continuing to reduce compensation to pickers for reasons unrelated to order fulfillment.

DETAILED DESCRIPTION

Figure 1:
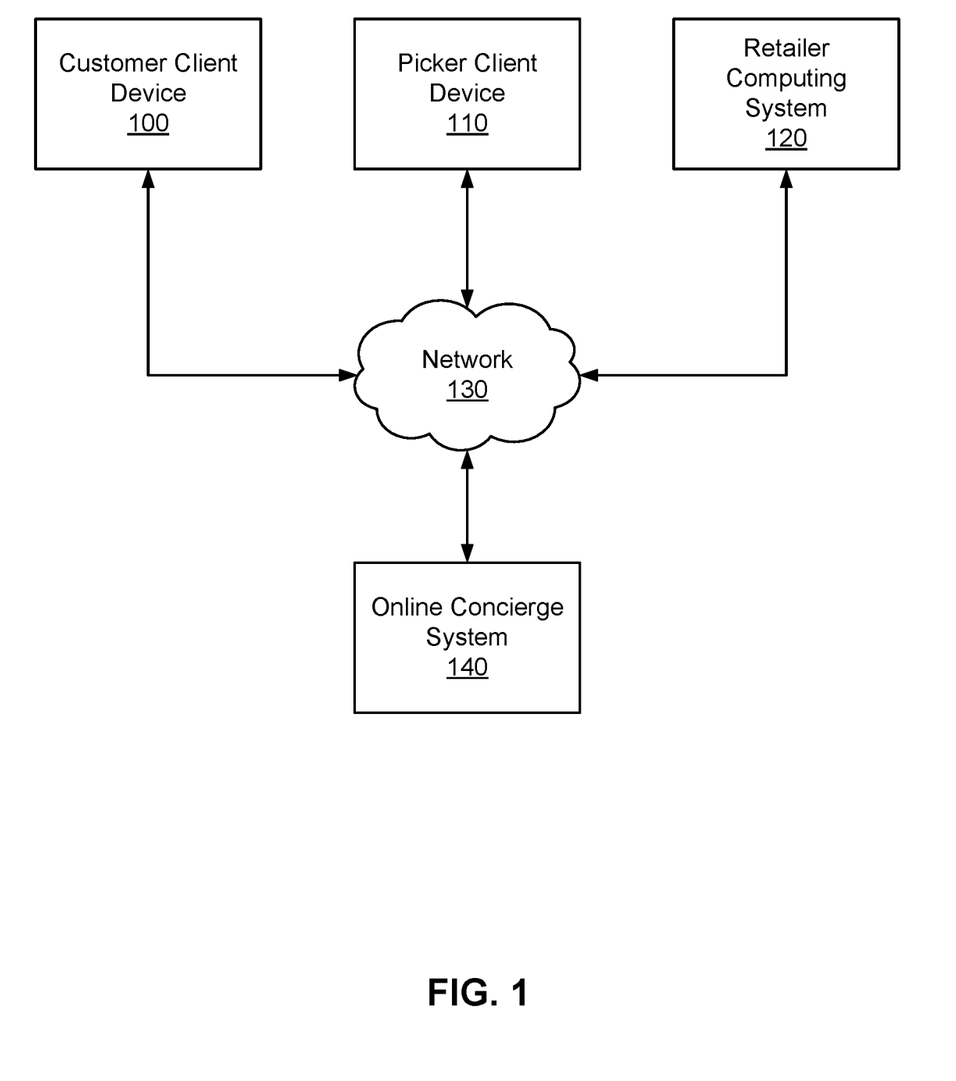
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
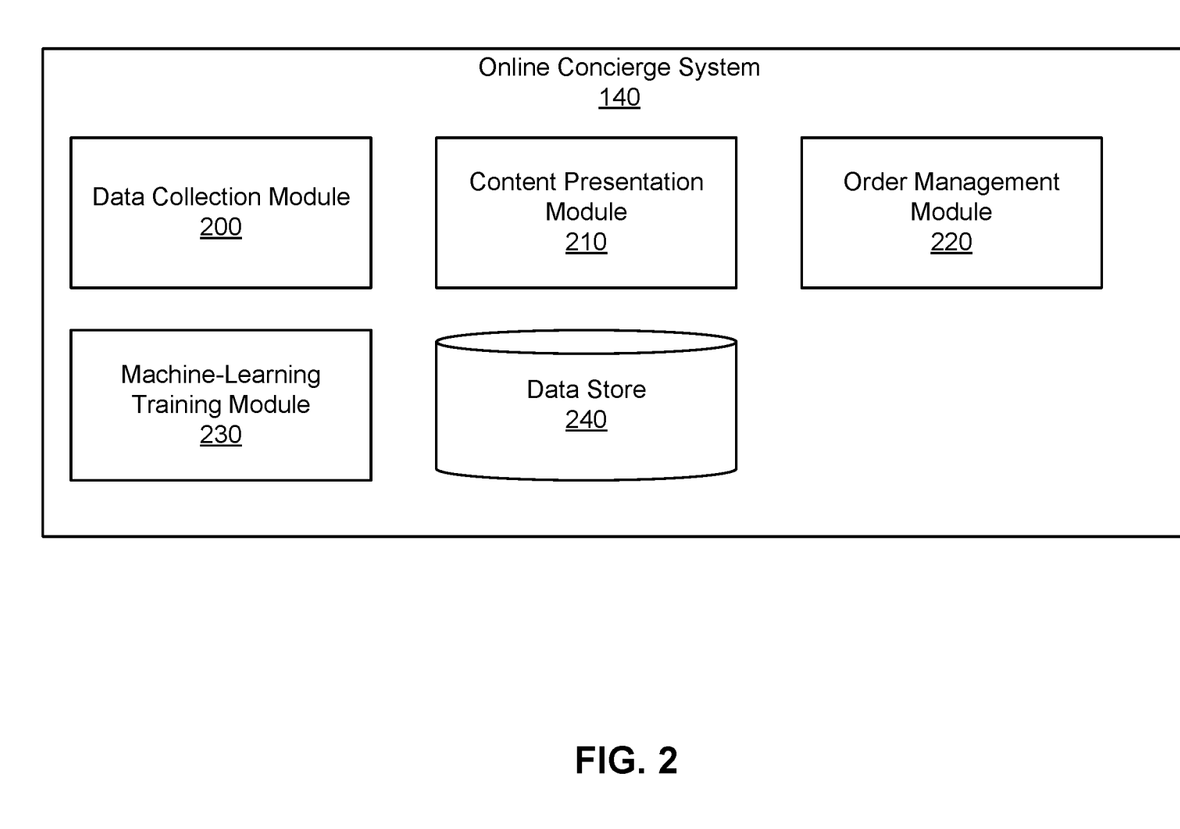
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

In various embodiments, the order management module 220 receives a request from a customer to decrease compensation from the customer to a picker who fulfilled an order from the picker. The customer specified the amount of compensation when creating the order. The reduction in compensation from the customer may be based on problems with order fulfillment by the picker (e.g., the order arrived later than a specified window, the customer received less than all of the items in the order, the customer received poor quality items in the order, etc.). However, the reduction in compensation may be unrelated to problems with order fulfillment, such as the customer seeking to save money on the order. As the amount of compensation from the customer was a factor for the picker when determining whether to select the order for fulfillment, reducing compensation from a customer to a picker for reasons unrelated to a problem with order fulfillment decreases a likelihood of the picker subsequently fulfilling orders for the online concierge system 140, reducing an overall number of orders capable of being fulfilled by the online concierge system 140.

To mitigate effects of a customer reducing compensation to a picker for reasons unrelated to order fulfillment, the order management module 220 applies a trained compensation reduction model to a received request to reduce compensation from a customer to a picker. As further described below in conjunction with FIGS. 3 and 4, the compensation reduction model determines a probability of the request from the customer to reduce compensation from the customer to the picker being unrelated to a problem with order fulfillment based on the amount by which the customer reduces compensation to the picker, characteristics of the customer, and indications of a problem with fulfillment of the order for which the request was received. The order management module 220 compares the probability from the compensation reduction model to a threshold and performs one or more remedial actions if the probability exceeds the threshold. As further described below in conjunction with FIGS. 3 and 4, example remedial actions include the order management module 220 providing compensation from the online concierge system 140 to the picker to offset the reduction in compensation by the customer, the order management module 220 transmitting a notification to the customer requesting the customer specify one or more reasons for reducing compensation to the picker, preventing the customer from subsequently placing orders through the online concierge system 140, or other actions to compensate the picker or prevent the customer from subsequently reducing compensation to pickers.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains a compensation reduction model based on previously fulfilled orders. To train the compensation reduction model, the machine learning training module 230 obtains a training dataset including multiple training examples from prior orders. Each training example includes an amount by which a customer reduced compensation to a picker for a prior order, characteristics of the customer corresponding to the prior order, and one or more indications of order fulfillment problems for the prior order. Each training example has a label applied, with the label indicating whether the reduction of compensation from the customer was unrelated to a problem with order fulfillment or was related to a problem with order fulfillment. For example, the label has a first value if the reduction in compensation was related to a problem with order fulfillment and has a second value if the reduction in compensation was unrelated to a problem with order fulfillment. The label applied to a training example is determined from one or more manual reviewers analyzing the order and the reduction in compensation to the picker in various embodiments.

The machine learning training module 230 applies the compensation reduction model to each training example of the training dataset in various embodiments. Application of the compensation reduction module to a training example outputs a predicted probability of the reduction in compensation to a picker in a training example is unrelated to a problem with order fulfillment for the prior order. The machine learning training module 230 scores the output from the compensation reduction model using a loss function. A loss function is a function that generates a score for the output of the compensation reduction model such that the score is higher when the compensation reduction model performs poorly and lower when the compensation reduction model performs well. The loss function determines the score based on a difference between a label applied to a training example and a probability of the reduction in compensation in the training example being unrelated to a problem with order fulfillment output by the compensation reduction model. Example loss functions include the mean square error function, the mean absolute error, hinge loss function, and the cross entropy loss function. The machine learning training module 230 updates a set of parameters for the compensation reduction model based on the score generated by the loss function. For example, the machine learning training module 230 may apply gradient descent to update the set of parameters. Training of the compensation reduction module is further described above in conjunction with FIG. 3.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
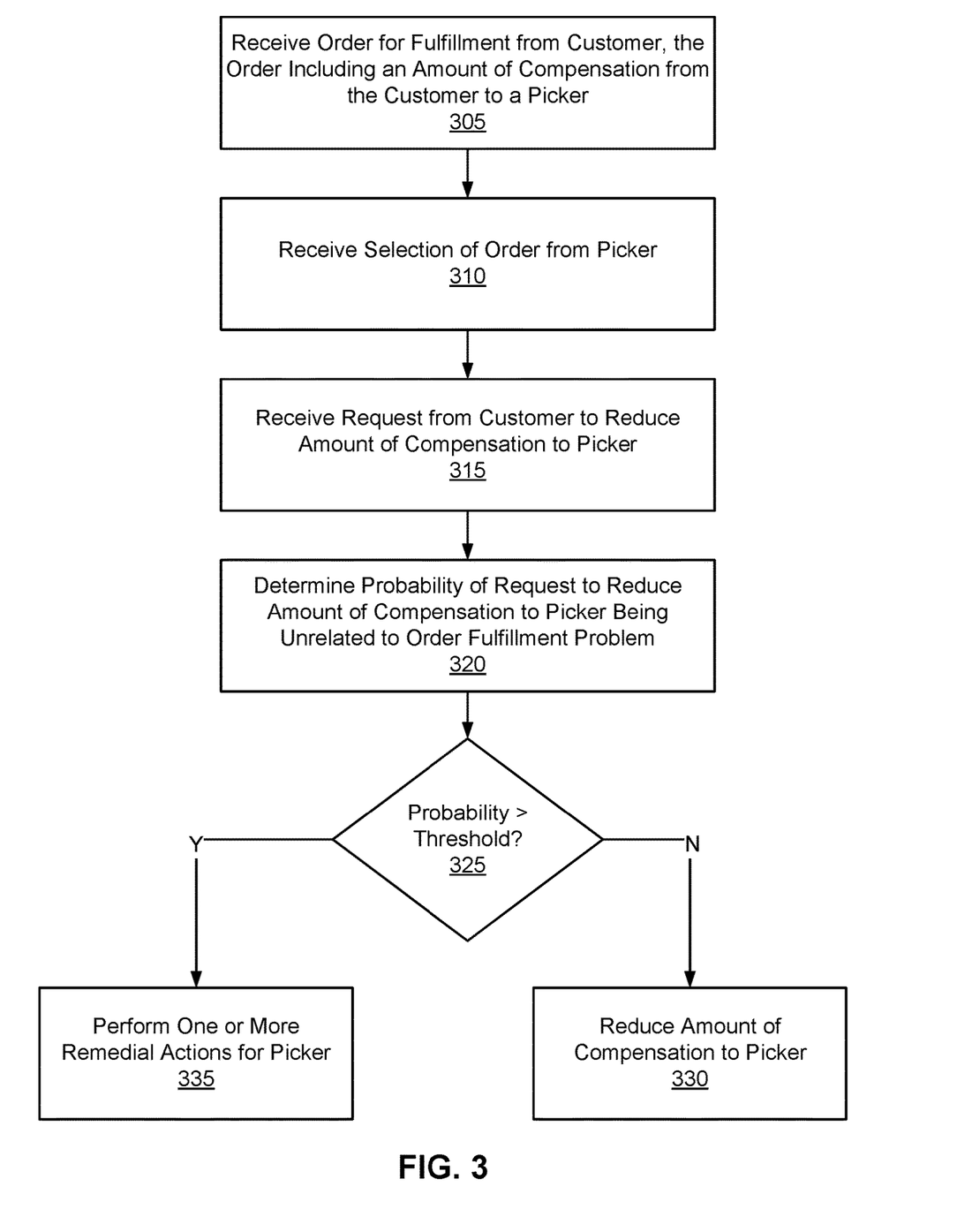
FIG. 3 is a flowchart of a method for determining probability of a reduction in compensation to a picker by a customer for an order being unrelated to a problem with fulfillment of the order, in accordance with one or more embodiments.

FIG. 3 is a flowchart for a method for determining a probability of a reduction in compensation to a picker by a customer for an order being unrelated to a problem with fulfillment of the order, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

An online concierge system 140 receives 305 an order for fulfillment from a customer. The order identifies a retailer and one or more items for a picker to obtain from the retailer and to provide to the customer. Additionally, the order specifies a time interval for fulfillment of the order, which is the time interval during which the customer expects to receive the items included in the order, and a location to which the items are delivered. Further, the order includes an amount of compensation from the customer to the picker when the order is fulfilled. Hence, the customer provides the amount of compensation in the order to the picker in response to receiving the items included in the order from the picker.

The online concierge system 140 receives 310 a selection of the order from a picker. In various embodiments, the online concierge system 140 displays information describing the order to the picker through an interface, with the picker selecting the order based on the displayed information. Information describing the order includes a number of items in the order, a distance for the picker to traverse to fulfill the order, and the amount of compensation the customer provides the picker for fulfilling the order. The information describing the order allows the picker to determine whether to select the order for fulfillment. As the amount of compensation the customer provides the picker for fulfilling the order is presented to the picker, the amount of compensation from the customer for order fulfillment affects a likelihood of the picker selecting the order for fulfillment.

In response to selecting the order, the picker obtains items included in the order from the retailer specified in the order. The picker delivers the obtained items to the location specified in the order. In various embodiments, the online concierge system 140 receives 315 a request from the customer to reduce the amount of compensation provided to the picker for fulfilling the order after the customer receives the items included in the order from the picker. This allows the customer to adjust the compensation to the picker in response to problems with order fulfillment, such as the customer receiving the items from the order later than a time interval specified by the order, the picker not receiving certain items included in the order, the items received by the customer having less than a threshold quality, or other problems reducing the customer's satisfaction with fulfillment of the order.

However, the online concierge system 140 may receive 315 a request from a customer to reduce the amount of compensation provided to the picker without the customer encountering a problem with order fulfillment. As the compensation expected by the picker influenced selection of the order for fulfillment by the picker, reducing compensation to the picker without a problem with order fulfillment decreases a number of orders the picker subsequently fulfills for the online concierge system 140. This reduces an overall number of orders capable of being fulfilled by the online concierge system 140. To discourage customers from reducing compensation provided to a picker without one or more problems with order fulfillment, the online concierge system 140 determines 320 a probability of the request for reducing compensation provided to the picker from the customer being unrelated to a problem with order fulfillment.

In various embodiments, the online concierge system 140 applies a trained compensation reduction model to the request to reduce the amount of compensation received from the customer for the order, to characteristics of the customer, and to one or more indications of a problem with fulfilling the order, with the compensation reduction model determining 320 the probability of the request for reducing the amount of compensation to the picker being unrelated to an order fulfillment problem. The compensation reduction model is a machine learning model trained using a training dataset including training examples from prior orders. Each of the prior orders corresponds to an order for which the online concierge system 140 previously received a complaint from a picker from reduction in compensation by a customer. For example, each training example of the training dataset includes an amount by which compensation for a prior order to a picker was reduced by a customer corresponding to the prior order, characteristics of the customer (e.g., a fraud score determined from prior communication with the customer, prior reductions in compensation received from the customer) for the prior order, and indications of problems with fulfillment of the prior order. Example indications of problems with fulfillment of the order include: a number of replacements for items made by the picker, an indication whether the order was fulfilled in a time interval specified by the order, a rating of the picker, or other information describing fulfillment of the order or prior fulfillment of orders by the picker. A label is applied to each training example, with the label indicating whether the reduction of compensation from the customer was unrelated to a problem with order fulfillment or was related to a problem with order fulfillment. The label has a value when the reduction of compensation from the customer was related to a problem with order fulfillment and has an alternative value when the reduction of compensation from the customer was unrelated to a problem with order fulfillment.

The online concierge system 140 trains the compensation reduction model by applying the compensation reduction model to each training example of the training dataset. The compensation reduction model is a set of weights stored on a non-transitory computer readable storage medium in various embodiments, with the compensation reduction model receiving an amount by which compensation for an order to a picker was reduced by a customer, characteristics of the customer, and indications of problems with fulfillment of the order and outputting a probability of the reduction in compensation from the customer is unrelated to a problem with order fulfillment. For training, the set of weights comprising the compensation reduction model is initialized.

After initializing the set of weights comprising the compensation reduction model, the online concierge system 140 generates the set of parameters (e.g., the weights) for the compensation reduction model by applying the compensation reduction model to multiple training examples of the training dataset. As further described above, each training example includes an amount by which compensation for an order to a picker was reduced by a customer, prior reductions in compensation received from the customer, characteristics of the customer, and indications of problems with fulfillment of the order, with a label applied to each training example indicating whether the reduction in compensation by the customer in the training example was unrelated to a problem with order fulfillment or was related to a problem with order fulfillment. Applying the compensation reduction model to a training example generates a predicted probability of the reduction in compensation by the customer in the training example being unrelated to a problem with order fulfillment.

For each training example of the training dataset to which the compensation reduction model is applied, the online concierge system 140 generates an error term based on the predicted probability of the reduction in compensation by the customer in the training example being unrelated to a problem with order fulfillment output by the compensation reduction model and the label applied to the training example. The error term is larger when a difference between the predicted probability of the reduction in compensation by the customer in the training example being unrelated to a problem with order fulfillment and the label applied to the training example is larger and is smaller when the difference between the predicted probability of the reduction in compensation by the customer in the training example being unrelated to a problem with order fulfillment and the label applied to the training example is smaller. In various embodiments, the online concierge system 140 generates the error term between the reduction in compensation by the customer in the training example being unrelated to a problem with order fulfillment output by the compensation reduction model and the label applied to the training example using a loss function. Example loss functions include a mean square error function, a mean absolute error, a hinge loss function, and a cross-entropy loss function.

The online concierge system 140 backpropagates the error term to update the set of parameters comprising the compensation reduction model and stops backpropagation in response to the error term, or to the loss function, satisfying one or more criteria. For example, the online concierge system 140 backpropagates the error term through the compensation reduction model to update parameters of the compensation reduction model until the error term has less than a threshold value. For example, the online system 140 may apply gradient descent to update the set of parameters. The online concierge system 140 stores the set of parameters comprising the compensation reduction model on a non-transitory computer readable storage medium after stopping the backpropagation.

The online concierge system 140 periodically retrains the compensation reduction model in various embodiments. To retrain the compensation reduction model, the online concierge system 140 generates additional training examples based on orders fulfilled between a time when the online concierge system 140 most recently trained the compensation reduction model and a time when the online concierge system 140 retrains the compensation reduction model. The online concierge system 140 applies the compensation reduction model to each of at least a set of the additional training examples and updates parameters of the compensation reduction model based on predicted probabilities of reduction in compensation by customers to pickers being unrelated to a problem with order fulfillment output by the compensation reduction model, as further described above. Periodically retraining the compensation reduction model allows the online concierge system 140 to update the compensation reduction model to account for changes in how customers reduce compensation to pickers for fulfilling orders over time.

The online concierge system 140 applies the trained compensation reduction model to the request to reduce the amount of compensation received from the customer for the order, characteristics of the customer, and one or more indications of a problem with order fulfillment for the order to determine 320 the probability of the request for reducing compensation provided from the customer to the picker being unrelated to a problem with order fulfillment. The online concierge system 140 determines 325 whether the probability of the request for reducing compensation provided to the picker from the customer being unrelated to a problem with order fulfillment exceeds a threshold. In various embodiments, the online concierge system 140 stores a value of the threshold, which may be modified over time or based on one or more criteria. In response to the probability of the request for reducing compensation provided to the picker from the customer being unrelated to a problem with order fulfillment being less than the threshold, the online concierge system 140 reduces 330 the amount of compensation to the picker based on the received request.

However, in response to determining 325 the probability of the request for reducing compensation provided from the customer to the picker being unrelated to a problem with order fulfillment exceeds the threshold, the online concierge system 140 performs 335 one or more remedial actions. The remedial actions may offset loss of compensation to the picker or increase an amount of input from the customer to reduce compensation provided to the picker, or a combination of compensating the picker and increasing interaction by the customer to reduce compensation to pickers. For example, a remedial action performed 335 by the online concierge system 140 is the online concierge system 140 providing the picker with at least a portion of the amount by which the customer reduced compensation to the picker. For example, the online concierge system 140 provides the picker with compensation that is based on the amount by which the customer reduced compensation to the picker. As another example, the online concierge system 140 provides the picker with up to a threshold value of compensation based on the amount by which the customer reduced compensation to the picker; for example, the online concierge system 140 provides the picker with up to a threshold amount of compensation in response to determining 325 the probability of the request for reducing compensation provided to the picker from the customer being unrelated to a problem with order fulfillment exceeded the threshold. The online concierge system 140 may transmit a notification or a message to a picker when the online concierge system 140 provides the picker with at least a portion of the compensation specified by the customer with the order.

Alternatively or additionally, the online concierge system 140 transmits a request to the customer to provide one or more reasons for reducing the amount of compensation to the picker in response to determining 325 the probability of the request for reducing compensation provided to the picker from the customer being unrelated to a problem with order fulfillment exceeds the threshold. In various embodiments, the online concierge system 140 transmits a message to the customer including a warning or other notification that the online concierge system 140 determined the request by the customer to reduce compensation to the picker was not warranted. The online concierge system 140 may store an indication in association with the customer that the online concierge system 140 determined the customer's request to reduce compensation to the picker was unrelated to a problem with order fulfillment. The indication may be incremented each time the online concierge system 140 determines a request from the customer to reduce compensation to one or more additional pickers was determined to be unrelated to a problem with order fulfillment. In response to the indication exceeding a threshold, the online concierge system 140 prevents the customer from placing subsequent orders via the online concierge system 140 in various embodiments. This allows the online concierge system 140 to reduce a likelihood of a customer continuing to penalize pickers for reasons unrelated to problems with order fulfillment by the pickers.

Figure 4:
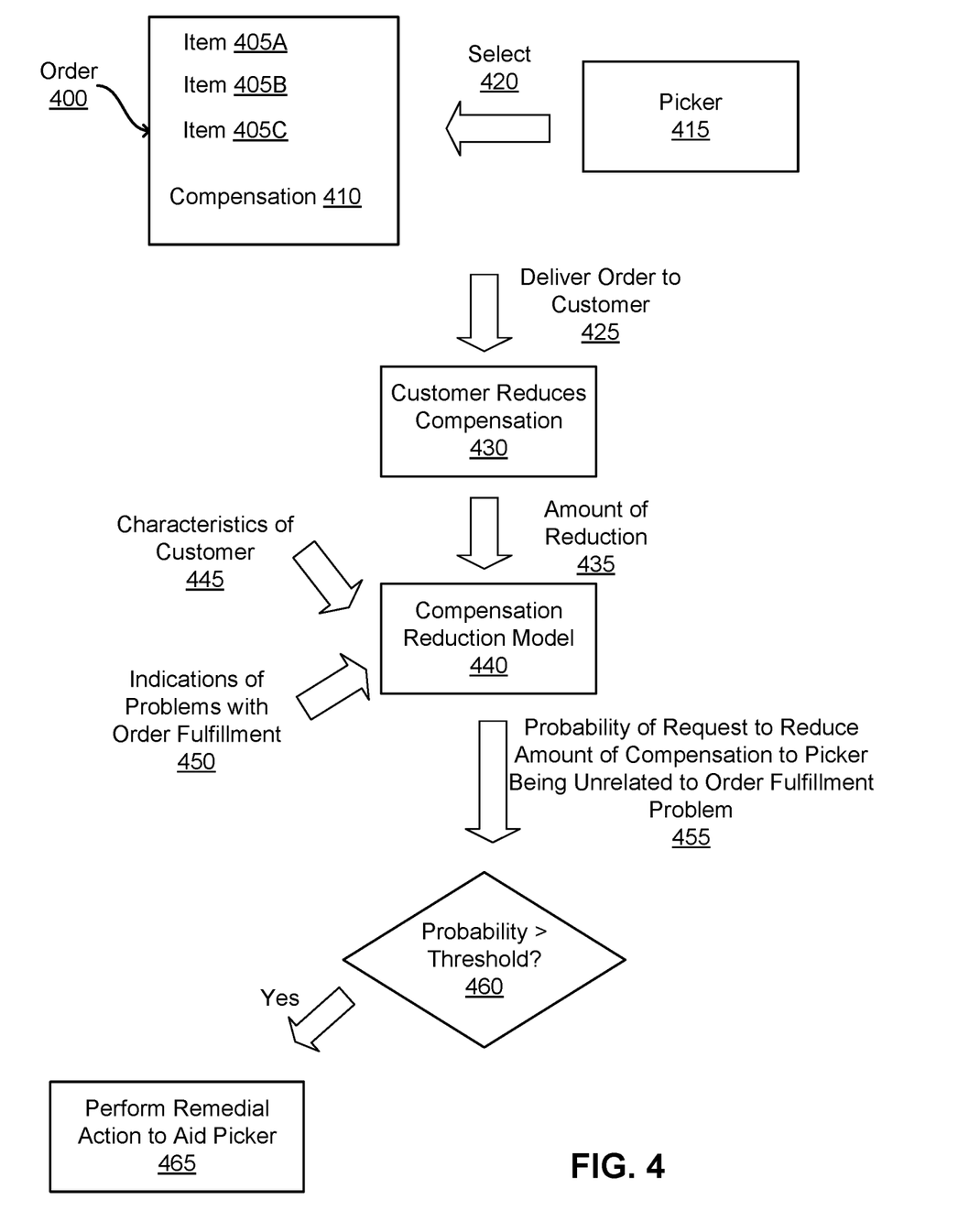
FIG. 4 is a process flow diagram of a method for determining probability of a reduction in compensation to a picker by a customer for an order being unrelated to a problem with fulfillment of the order, in accordance with one or more embodiments.

FIG. 4 is a process flow diagram of one or more embodiments of a method for an online concierge system 140 determining a probability of a reduction in compensation from a customer to a picker for an order being unrelated to a problem with fulfillment of the order. The online concierge system 140 receives an order 400 for fulfillment from a customer. The order includes items 405A, 405B, 405C (also referred to individually and collectively using reference number 405) and identifies a retailer from which the items 405 are to be obtained. The order 400 also includes an amount of compensation the customer provides to a picker who fulfills the order when the picker delivers the items 405 included in the order to the customer. In various embodiments, the order 400 also specifies a time interval during which the customer requests fulfillment of the order 400, allowing the customer to specify when a picker provides the items 405 included in the order 400 to the customer.

After receiving the order 400, the online concierge system 140 identifies the order 400 to one or more pickers, and a picker 415 selects 420 the order for fulfillment. For example, the online concierge system 140 displays an interface to the picker 415 identifying one or more orders and information describing each order. In various embodiments, the interface displays a number of items included in an order, a retailer from which items in an order are to be obtained, a distance between the retailer and a location where items in an order are to be delivered, and an amount of compensation provided by the customer to the picker 415 for fulfilling the order. The interface may display other information describing an order in various embodiments. From the interface, the picker 415 selects 420 the order 400 for fulfillment. When selecting 420 an order for fulfillment, the picker 415 may account for the amount of compensation included in different orders, allowing a customer to increase a likelihood of the picker 415 selecting 420 an order for fulfillment by including a large amount of compensation in the order.

In response to selecting 420 the order 400, the picker 415 obtains the items 405 included in the order 400. The picker 415 delivers 425 the items 405 included in the order 400 to the customer from whom the order 400 was received. The online concierge system 140 allows the customer to modify the amount of compensation 410 to the picker 415 for fulfilling the order 400 when the customer receives the order 400. While this allows the customer to increase the amount of compensation 410 the customer provides to the picker 415 if the customer's satisfaction with fulfillment of the order is high, the customer may also decrease 430 the amount of compensation 410 to the picker 415 if there were problems with order fulfillment. For example, the customer may reduce 430 the amount of compensation 410 to the picker 415 in response to the picker 415 fulfilling the order 400 later than a time interval specified by the order, in response to customer not receiving one or more items 405 included in the order 400, in response to the picker 415 including low quality items in the order, or in response to one or more other problems with the items delivered by the picker 415.

However, the customer may reduce 430 the amount of compensation 410 to the picker 415 for a reason unrelated to a problem with order fulfillment. For example, the customer may reduce 430 the amount of compensation 410 to the picker 415 to decrease an overall cost of the order to the customer. As the picker 415 accounted for the amount of compensation 410 received from the customer when selecting 420 the order 400 for fulfillment, reduction 430 of the amount of compensation 410 for the picker 415 for a reason unrelated to a problem with order fulfillment materially changes information on which the picker 415 relied when determining whether to select 420 the order 400 for fulfillment. The customer reducing 430 the amount of compensation 410 provided to the picker 415 after the order 400 was fulfilled for a reason unrelated to order fulfillment decreases a likelihood of the picker 415 continuing to fulfill orders for the online concierge system 140, reducing a capability of the online concierge system 140 to fulfill orders.

To provide protection for the picker 415 against a customer reducing 430 the amount of compensation 410 the customer provides the picker 415 for fulfilling the order 400, in response to receiving a request from the customer to reduce 430 the amount of compensation 410 to the picker 415, the online concierge system 140 determines an amount 435 by which the customer is decreasing the compensation provided to the picker 415. In various embodiments, the online concierge system 140 determines a monetary amount by which the amount of compensation 410 provided by the customer to the picker 415 is decreased, determines a percentage by which the amount of compensation 410 provided by the customer to the picker 415 is decreased, or determines a monetary amount by which the amount of compensation 410 provided by the customer to the picker 415 is decreased and a percentage by which the amount of compensation 410 provided by the customer to the picker 415 is decreased. The online concierge system 140 applies a trained compensation reduction model 440 to the amount 435 by which the customer reduced the amount of compensation 410 for the picker 415, to characteristics 445 of the customer, and to one or more indications 450 of problems with order fulfillment for the order 400, as further described above in conjunction with FIG. 3. In various embodiments, characteristics 445 of the customer include a fraud score determined from prior communication with the customer, prior reductions in compensation received from the customer, or other information describing information the online concierge system 140 previously received from the customer. Example indications of problems with fulfillment of the order include: a number of replacements for items made by the picker 415, an indication whether the order was fulfilled in a time interval specified by the order 400, a rating of the picker, a number of items 405 in the order 400 not received by the customer, or other information describing fulfillment of the order or prior fulfillment of orders by the picker 415.

From the amount 435 by which the customer reduced the amount of compensation 410 for the picker 415, characteristics 445 of the customer, and the one or more indications 450 of problems with order fulfillment for the order 400, the compensation reduction model 440 determines a probability 455 of the request from the customer to reduce 430 compensation to the picker 415 being unrelated to a problem with order fulfillment by the picker 415. As further described above in conjunction with FIG. 3, the online concierge system 140 trains the compensation reduction model 440 using prior orders fulfilled by pickers and prior reductions in compensation to pickers from customers corresponding to the prior orders. Using prior orders to train the compensation reduction model 440 allows the online concierge system 140 to account for actions by prior customers and pickers when customers previously reduced compensation to pickers.

In various embodiments, the online concierge system 140 compares 460 the determined probability 455 of the request from the customer to reduce 430 compensation to the picker 415 being unrelated to a problem with order fulfillment by the picker 415 to a threshold. In response to the probability 455 of the request from the customer to reduce 430 compensation to the picker 415 being unrelated to a problem with order fulfillment by the picker 415 being less than the threshold, the online concierge system 140 determines that the request to reduce 430 the amount of compensation 410 the customer provides the picker 415 for fulfillment of the order 400 was related to a problem with order fulfillment and reduces the amount of compensation 410 to the picker 415 based on the request from the customer. However, in response to the probability 455 of the request from the customer to reduce 430 compensation to the picker 415 being unrelated to a problem with order fulfillment by the picker 415 exceeding the threshold, the online concierge system 140 determines the reduction 430 in compensation to the picker 415 was unrelated to a problem with order fulfillment by the picker 415 and performs 465 one or more remedial actions to aid the picker 415.

An example remedial action by the online concierge system 140 is the online concierge system 140 providing compensation to the picker 415 in response to the probability 460 of the request from the customer to reduce 430 the amount of compensation the customer provides the picker 415 being unrelated to the problem with order fulfillment exceeding the threshold. The compensation provided by the online concierge system 140 to the picker 415 may be based on the amount 435 of reduction in compensation to the picker 415 by the customer, with larger amounts 435 of reduction corresponding to increased compensation from the online concierge system 140 to the picker 415. In some embodiments, the amount of compensation from the online concierge system 140 does not exceed a limit maintained by the online concierge system 140, providing an upper bound on the compensation from the online concierge system 140 to the picker 415. Alternatively or additionally, the online concierge system 140 transmits a notification to the customer that reduction 430 in compensation to the picker 415 was determined to be unrelated to the problem with order fulfillment, with the notification including a request for the customer to provide one or more reasons for the reduction 430 in compensation from the customer to the picker 415. Requesting one or more reasons for the reduction 430 in compensation increases an amount of interaction with the online concierge system 140 for the customer to reduce 430 compensation to the picker 415 to discourage the customer from subsequently reducing compensation to a picker for reasons unrelated to order fulfillment.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, the method comprising:

receiving an order from a user for fulfillment by the computer system, the order including one or more items and an amount of compensation the user provides a picker for fulfilling the order;

receiving a selection of the order for fulfillment by the picker;

receiving a request from the user to reduce the amount of compensation the user provides the picker after the order has been fulfilled;

determining a probability of the request to reduce the amount of compensation the user provides the picker being unrelated to a problem with order fulfillment by applying a compensation reduction model to the request, characteristics of the user, and indications of an order fulfillment problem, wherein the compensation reduction model is trained by:

obtaining a training dataset including a plurality of training examples, each training example including an amount by which compensation to an additional picker for a prior order was reduced, characteristics of the user from whom the prior order was received, and indications of problems with fulfillment of the prior order, each training example having a label indicating whether the reduction of compensation from the user from whom the prior order was received was unrelated to an order fulfillment problem;

applying the compensation reduction model to each training example of the training dataset to generate a predicted probability of the request for reducing the amount of compensation to the picker for the prior order being unrelated to a problem with order fulfillment;

scoring the compensation reduction model using a loss function and the label of the training example; and updating one or more parameters of the compensation reduction model by backpropagation based on the scoring until one or more criteria are satisfied;

determining that the probability of the request to reduce the amount of compensation the user provides the picker being unrelated to the problem with order fulfillment exceeds a threshold; and performing, by the computing system, one or more remedial actions in response to the determining.

2. The method of claim 1, wherein performing, by the computing system, one or more remedial actions in response to the probability of the request to reduce the amount of compensation the user provides the picker being unrelated to the problem with order fulfillment exceeding the threshold comprises:

transmitting a notification to the user that the computing system determined the request to reduce the amount of compensation the user provides the picker was unrelated to the problem with order fulfillment, the notification including a request for the user to provide one or more reasons for the request to the computing system.

3. The method of claim 2, wherein performing, by the computing system, one or more remedial actions in response to the probability of the request to reduce the amount of compensation the user provides the picker being unrelated to the problem with order fulfillment exceeding the threshold further comprises:

storing, by the computing system, an indication that the computing system determined the request to reduce the amount of compensation the user provides the picker was unrelated to the problem with order fulfillment in association with the user.

4. The method of claim 2, wherein performing, by the computing system, one or more remedial actions in response to the probability of the request to reduce the amount of compensation the user provides the picker being unrelated to the problem with order fulfillment exceeding the threshold further comprises:

preventing receipt by the computing system of one or more subsequent orders from the user in response to the indication exceeding a threshold value.

5. The method of claim 1, wherein performing, by the computing system, one or more remedial actions in response to the probability of the request to reduce the amount of compensation the user provides the picker being unrelated to the problem with order fulfillment exceeding the threshold comprises:

providing compensation from the computing system to the picker in response to the probability of the request to reduce the amount of compensation the user provides the picker being unrelated to the problem with order fulfillment exceeding the threshold.

6. The method of claim 5, wherein the compensation from the computing system to the picker is based on an amount by which the request from the user reduced compensation to the picker.

7. The method of claim 5, wherein the compensation from the computing system to the picker is less than a threshold amount.

8. The method of claim 1, wherein indications of the order fulfillment problem comprise one or more of: a number of items in the order replaced by the picker, an indication whether the order was delivered to the user within a time interval specified by the order, a rating of the picker maintained by the computing system, or any combination thereof.

9. The method of claim 1, wherein characteristics of the user from whom the prior order was received include one or more of: prior requests from the user to reduce compensation to one or more pickers, a score indicating fraudulent information the computing system received from the user, or any combination thereof.

10. A computer program product comprising a non-transitory computer readable storage medium having instructions encoded thereon that, when executed by a processor, cause the processor to perform steps comprising:

receiving an order from a user for fulfillment by the computer system, the order including one or more items and an amount of compensation the user provides a picker for fulfilling the order;

receiving a selection of the order for fulfillment by the picker;

receiving a request from the user to reduce the amount of compensation the user provides the picker after the order has been fulfilled;

determining a probability of the request to reduce the amount of compensation the user provides the picker being unrelated to a problem with order fulfillment by applying a compensation reduction model to the request, characteristics of the user, and indications of an order fulfillment problem, wherein the compensation reduction model is trained by:

obtaining a training dataset including a plurality of training examples, each training example including an amount by which compensation to an additional picker for a prior order was reduced, characteristics of the user from whom the prior order was received, and indications of problems with fulfillment of the prior order, each training example having a label indicating whether the reduction of compensation from the user from whom the prior order was received was unrelated to an order fulfillment problem;

applying the compensation reduction model to each training example of the training dataset to generate a predicted probability of the request for reducing the amount of compensation to the picker for the prior order being unrelated to a problem with order fulfillment;

scoring the compensation reduction model using a loss function and the label of the training example; and updating one or more parameters of the compensation reduction model by backpropagation based on the scoring until one or more criteria are satisfied;

determining that the probability of the request to reduce the amount of compensation the user provides the picker being unrelated to the problem with order fulfillment exceeds a threshold; and performing, by the computing system, one or more remedial actions in response to the determining.

11. The computer program product of claim 10, wherein performing, by the online concierge system, one or more remedial actions in response to the probability of the request to reduce the amount of compensation the user provides the picker being unrelated to the problem with order fulfillment exceeding the threshold comprises:

transmitting a notification to the user that the online concierge system determined the request to reduce the amount of compensation the user provides the picker was unrelated to the problem with order fulfillment, the notification including a request for the user to provide one or more reasons for the request to the online concierge system.

12. The computer program product of claim 11, wherein performing, by the online concierge system, one or more remedial actions in response to the probability of the request to reduce the amount of compensation the user provides the picker being unrelated to the problem with order fulfillment exceeding the threshold further comprises:

storing, by the online concierge system, an indication that the online concierge system determined the request to reduce the amount of compensation the user provides the picker was unrelated to the problem with order fulfillment in association with the user.

13. The computer program product of claim 11, wherein performing, by the online concierge system, one or more remedial actions in response to the probability of the request to reduce the amount of compensation the user provides the picker being unrelated to the problem with order fulfillment exceeding the threshold further comprises:

preventing receipt by the online concierge system of one or more subsequent orders from the user in response to the indication exceeding a threshold value.

14. The computer program product of claim 10, wherein performing, by the online concierge system, one or more remedial actions in response to the probability of the request to reduce the amount of compensation the user provides the picker being unrelated to the problem with order fulfillment exceeding the threshold comprises:

providing compensation from the online concierge system to the picker in response to the probability of the request to reduce the amount of compensation the user provides the picker being unrelated to the problem with order fulfillment exceeding the threshold.

15. The computer program product of claim 14, wherein the compensation from the online concierge system to the picker is based on an amount by which the request from the user reduced compensation to the picker.

16. The computer program product of claim 14, wherein the compensation from the online concierge system to the picker is less than a threshold amount.

17. The computer program product of claim 10, wherein indications of the order fulfillment problem comprise one or more of: a number of items in the order replaced by the picker, an indication whether the order was delivered to the user within a time interval specified by the order, a rating of the picker maintained by the online concierge system, or any combination thereof.

18. The computer program product of claim 10, wherein characteristics of the user from whom the prior order was received include one or more of: prior requests from the user to reduce compensation to one or more pickers, a score indicating fraudulent information the online concierge system received from the user, or any combination thereof.

19. A system comprising:
a processor; and
a non-transitory computer readable storage medium having instructions encoded thereon that, when executed by the processor, cause the processor to perform steps comprising:

receiving an order from a user for fulfillment by the computer system, the order including one or more items and an amount of compensation the user provides a picker for fulfilling the order;

receiving a selection of the order for fulfillment by the picker;

receiving a request from the user to reduce the amount of compensation the user provides the picker after the order has been fulfilled;

determining a probability of the request to reduce the amount of compensation the user provides the picker being unrelated to a problem with order fulfillment by applying a compensation reduction model to the request, characteristics of the user, and indications of an order fulfillment problem, wherein the compensation reduction model is trained by:

obtaining a training dataset including a plurality of training examples, each training example including an amount by which compensation to an additional picker for a prior order was reduced, characteristics of the user from whom the prior order was received, and indications of problems with fulfillment of the prior order, each training example having a label indicating whether the reduction of compensation from the user from whom the prior order was received was unrelated to an order fulfillment problem;

applying the compensation reduction model to each training example of the training dataset to generate a predicted probability of the request for reducing the amount of compensation to the picker for the prior order being unrelated to a problem with order fulfillment;

scoring the compensation reduction model using a loss function and the label of the training example; and updating one or more parameters of the compensation reduction model by backpropagation based on the scoring until one or more criteria are satisfied;

determining that the probability of the request to reduce the amount of compensation the user provides the picker being unrelated to the problem with order fulfillment exceeds a threshold; and performing, by the computing system, one or more remedial actions in response to the determining.

20. The system of claim 19, wherein performing, by the online concierge system, one or more remedial actions in response to the probability of the request to reduce the amount of compensation the user provides the picker being unrelated to the problem with order fulfillment exceeding the threshold comprises:

providing compensation from the online concierge system to the picker in response to the probability of the request to reduce the amount of compensation the user provides the picker being unrelated to the problem with order fulfillment exceeding the threshold.

\* \* \* \* \*